(12) United States Patent
Kim et al.

(10) Patent No.: US 11,127,208 B2
(45) Date of Patent: Sep. 21, 2021

(54) METHOD FOR PROVIDING VIRTUAL REALITY IMAGE AND PROGRAM USING SAME

(71) Applicant: CLICKED, INC., Seoul (KR)

(72) Inventors: Tae Wook Kim, Yangju-si (KR); Ha Ram Lee, Seoul (KR); Duk Young Jung, Seoul (KR)

(73) Assignee: CLICKED, INC., Seoul (KR)

( * ) Notice: Subject to any disclaimer, the term of this patent is extended or adjusted under 35 U.S.C. 154(b) by 11 days.

(21) Appl. No.: 16/833,473

(22) Filed: Mar. 27, 2020

(65) Prior Publication Data
US 2020/0286287 A1 Sep. 10, 2020

Related U.S. Application Data

(63) Continuation of application No. PCT/KR2018/011594, filed on Sep. 28, 2018.

(30) Foreign Application Priority Data

Sep. 29, 2017 (KR) .................. 10-2017-0128020

(51) Int. Cl.
*G06T 19/00* (2011.01)
*G06F 3/01* (2006.01)
*H04L 29/06* (2006.01)

(52) U.S. Cl.
CPC .............. *G06T 19/00* (2013.01); *G06F 3/012* (2013.01); *H04L 67/38* (2013.01); *G06T 2200/16* (2013.01); *G06T 2210/21* (2013.01)

(58) Field of Classification Search
CPC .......... G06F 3/011; G06F 3/012; G06T 11/00; G06T 15/00; G06T 19/00; G06T 19/006;
(Continued)

(56) References Cited

U.S. PATENT DOCUMENTS

2006/0221076 A1* 10/2006 Takahashi .............. G06T 13/20
345/427
2016/0179336 A1* 6/2016 Ambrus .............. G02B 27/017
715/768
(Continued)

FOREIGN PATENT DOCUMENTS

CN 1462416 A 12/2003
CN 105912123 A 8/2016
(Continued)

OTHER PUBLICATIONS

Office Action issued in TW 107134456; mailed by the Taiwan Ministry of Economic Affairs Intellectual Property Office dated Aug. 29, 2019.
(Continued)

*Primary Examiner* — Sae Won Yoon
(74) *Attorney, Agent, or Firm* — Studebaker & Brackett PC

(57) ABSTRACT

Disclosed are a method for providing a virtual reality image, and a program using the same. The method includes receiving virtual reality image data from a server and allocating the virtual reality image data to a first layer, generating a second layer containing control information of at least one controller, receiving movement information of the at least one controller, and determining a collision point between a predetermined object in the virtual reality image data and the control information based on the movement information, modifying the control information based on a normal vector at the collision point, and allocating combination data including the modified control information to the second layer, and synthesizing the first layer and the second layer with each other to generate a last image frame.

10 Claims, 13 Drawing Sheets

(58) Field of Classification Search
CPC . G06T 2200/16; G06T 2210/21; H04L 67/38; H04N 13/00; H04N 13/156; H04N 21/81; H04N 21/816; H04N 21/854
USPC .......................................................... 345/419
See application file for complete search history.

(56) References Cited

U.S. PATENT DOCUMENTS

| | | | |
|---|---|---|---|
| 2017/0038830 A1 | 2/2017 | Clement et al. | |
| 2017/0052701 A1 | 2/2017 | Rosenfeld et al. | |
| 2017/0344223 A1* | 11/2017 | Holzer | G06K 9/72 |
| 2017/0358137 A1* | 12/2017 | Auten | A63F 13/52 |
| 2018/0197334 A1* | 7/2018 | Kitazono | A63F 13/40 |

FOREIGN PATENT DOCUMENTS

| | | |
|---|---|---|
| CN | 106507128 A | 3/2017 |
| CN | 107111979 A | 8/2017 |
| EP | 1134702 A2 | 9/2001 |
| JP | 2004-505394 A | 2/2004 |
| JP | 2012-124884 A | 6/2012 |
| JP | 2017-004356 A | 1/2017 |
| KR | 10-1661142 B1 | 10/2016 |
| KR | 10-2016-0139461 A | 12/2016 |
| KR | 10-2017-0031676 A | 3/2017 |
| KR | 10-2017-0093451 A | 8/2017 |
| KR | 10-2017-0096129 A | 8/2017 |
| TW | 201721519 A | 6/2017 |

OTHER PUBLICATIONS

The extended European search report issued by the European Patent Office dated Apr. 21, 2021, which corresponds to European Patent Application No. 18860265.0-1209 and is related to U.S. Appl. No. 16/833,473.

An Office Action; "Notice of Reasons for Refusal", mailed by the Japanese Patent Office dated Mar. 23, 2021, which corresponds to Japanese Patent Application No. 2020-517853 and is related to U.S. Appl. No. 16/833,473; with English language translation.

An Office Action mailed by China National Intellectual Property Administration dated Apr. 1, 2021, which corresponds to Chinese Patent Application No. 201880070405.9 and is related to U.S. Appl. No. 16/833,473; with English language translation.

* cited by examiner

Two frames missing

First last image frame

First time-point second alternative image frame

Second time-point

Third last image frame

Third time-point

METHOD FOR PROVIDING VIRTUAL REALITY IMAGE AND PROGRAM USING SAME

CROSS-REFERENCE TO RELATED APPLICATIONS

The present application is a continuation of International Patent Application No. PCT/KR2018/011594, filed Sep. 28, 2018, which is based upon and claims the benefit of priority to Korean Patent Application No. 10-2017-0128020, filed on Sep. 29, 2017. The disclosures of the above-listed applications are hereby incorporated by reference herein in their entirety.

BACKGROUND

Embodiments of the inventive concept described herein relate to a method for providing a virtual reality image and a program using the same, and more particularly, to a method or program for synthesizing and providing an image in conformity with a shape and a surface of an object in virtual reality content.

Virtual reality (VR) is a virtual space created through a computer, and is a space that achieves reality via 3D visual effect. Technology to implement the virtual reality may process a user's input in real time to allow the user to feel as when the user are in a real world. The VR becomes a next-generation technology beyond a multimedia.

A virtual reality environment provides a sense of immersion to the user to allow the user to experience an object or situation that does not actually exist as well as to simulate a real object. This virtual reality environment may be applied to various fields. For example, the virtual reality environment has been used in a variety of fields, from engineering fields such as automobile designs and simulation experiments to medical fields and cultural content fields.

The term "virtual reality (VR)" has been interchanged with a virtual environment, a virtual presence, an artificial world, a virtual world, and a cyber space, depending on a viewing point. However, in general, the virtual reality (VR) may refer a technology that provides a user with a three-dimensional virtual world as created by a computer similar to a real world, and provides input means that may be freely manipulated in real time for the virtual world, and sensory feedback means that may provide a realistic sense in response to user manipulation of the input means, thereby enable artificial experience.

Recently, an approach has emerged in which a mobile terminal is combined with a VR device, and the mobile terminal performs information processing to generate a VR image and then delivers the VR image to a VR device. Conventionally, the mobile terminal as a computer that performs information processing is connected to the VR device to reproduce the image via a cable. This may be problematic due to the cable. However, in the above approach, the problem caused by the cable may be solved because the mobile terminal is combined with the VR device. However, the mobile terminal may not execute a high level specification program compared to a PC. Thus, in the above approach, a high level specification VR game may not be executed or a high-resolution VR image may not be displayed.

SUMMARY

Embodiments of the inventive concept separate a computing device for generating a virtual reality image and a device for generating content to be presented in the virtual reality image from each other, thereby to provide a high-definition virtual reality image wirelessly.

Further, embodiments of the inventive concept modify content to be displayed on a surface of an object existing in a virtual reality image into an optimal shape and provide a user with the content.

Purposes to be achieved by the inventive concept are not limited to those as mentioned above. Still other purposes as not mentioned will be clearly understood by those skilled in the art from following descriptions.

According to an exemplary embodiment, a method for providing a virtual reality image includes receiving virtual reality image data from a server and allocating the virtual reality image data to a first layer, generating a second layer containing control information of at least one controller, receiving movement information of the at least one controller, and determining a collision point between a predetermined object in the virtual reality image data and the control information based on the movement information, modifying the control information based on a normal vector at the collision point, and allocating combination data including the modified control information to the second layer, and synthesizing the first layer and the second layer with each other to generate a last image frame.

The receiving of the virtual reality image data and the allocating of the data to the first layer may include dividing the virtual reality image data into a plurality of overlay elements and receiving the plurality of overlay elements via separate channels, respectively, and combining the plurality of overlay elements received via the separate channels, and allocating the combination of the overlay elements to each of a plurality of first layers.

The determining of the collision point may include receiving an overlay element containing an object for determining the collision point via a first channel, determining, by a client, the collision point based on the received overlay element, and determining the normal vector at the collision point.

The determining of the collision point may include transmitting the movement information of the controller to the server, and requesting the collision point and the normal vector, and receiving, from the server, the collision point between the control information and the predetermined object in the virtual reality image data, and the normal vector at the collision point, wherein the collision point and the normal vector are determined by the server.

In addition, another method and system for implementing the inventive concept, and a computer readable recording medium for recording a computer program for executing the method may be further provided.

According to the inventive concept, a variety of effects may be achieved as follows.

According to one embodiment, it is possible to compensate for the omission of the image frame at the specific time-point due to wireless transmission failure of the virtual reality image frame. Thus, the client may naturally reproduce the image while an entire view of the virtual reality space is not shaken even when a specific image frame is not received.

Further, according to one embodiment, extracting and transmitting only one frame from an entire image or generating and transmitting only a frame corresponding to the reproduction direction data may allow presenting a high-resolution image or reducing a communication traffic amount even when transmitting the virtual reality image content in a wireless manner.

Further, according to an embodiment, it is possible to present a real-time image that is immediately responsive to the user movement and is optimized for an object surface of the virtual reality image. Therefore, reality of the virtual reality image and the user immersion thereto may be enhanced.

Further, according to an embodiment, it is possible to compensate for the omission of the image frame even when the frame omission occurs due to a network delay or when performing the virtual reality image correction, thereby to prevent an image such as a crosshair from being displayed on a point other than a point actually indicated by the user.

The effects of the inventive concept are not limited to the effects mentioned above. Other effects not mentioned will be clearly understood by those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
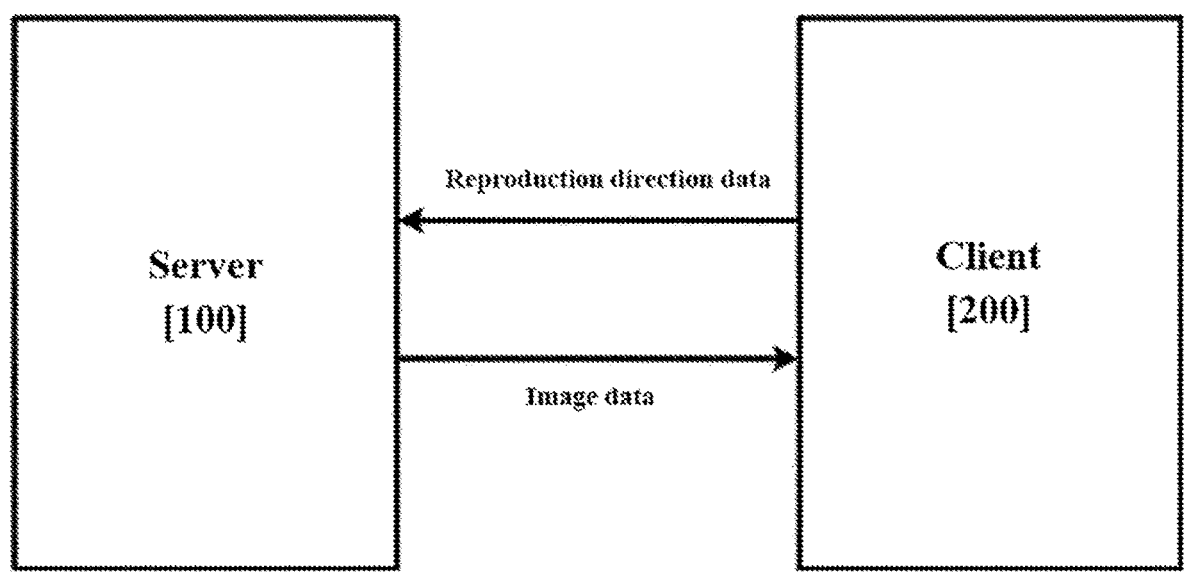
FIG. 1 is a configuration diagram of a system for providing a virtual reality image according to an embodiment.

Hereinafter, exemplary embodiments of the inventive concept will be described in detail with reference to the accompanying drawings. Advantages and features of the inventive concept, and methods of achieving them will become apparent with reference to embodiments described below in detail in conjunction with the accompanying drawings. However, the inventive concept is not limited to the embodiments disclosed below, but may be implemented in various forms. The present embodiments are provided to merely complete the disclosure of the inventive concept, and to merely fully inform those skilled in the art of the inventive concept of the scope of the inventive concept. The inventive concept is only defined by the scope of the claims. Like reference numerals refer to like elements throughout the disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing the embodiments only and is not intended to limit the inventive concept. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Hereinafter, a virtual reality image transmission and reception system according to embodiments of the inventive concept will be described with reference to the drawings.

FIG. 1 is a configuration diagram of a virtual reality image transmission and reception system according to an embodiment of the inventive concept.

The virtual reality image transmission and reception system according to an embodiment of the inventive concept includes a server 100, and a client 200.

The server 100 is a computer that generates a virtual reality (VR) image. The server 100 performs information processing therein to generate the VR image to be provided to the client 200. For example, when the VR image is an image related to a specific game as executed, the server 100 executes a game program to generate appropriate image data and transmit the image data to the client 200 via wired communication or wireless communication.

Further, upon receiving the image data from the server 100, the client 200 may add information on the virtual reality image and display the VR image having the information added thereto on a screen. In this connection, the added information may include a user graphic interface including a controller and a central pointer of the controller.

Further, a collision point based on an object contained in the virtual reality image and a direction indicated by the central pointer may be determined so that the control information (e.g., crosshair) is accurately presented at a position indicated by a user line-of-sight or the central pointer of the controller or a HMD. The determination of the collision point may be performed on the server 100 or the client 200. The client 200 may modify the control information based on the determined collision point and a normal vector at the collision point and add the modified control information to the VR image to generate a last image frame. Specifically, combination data to represent "the user line-of-sight", "the central pointer of the controller", etc. and the collision point of the virtual reality image are calculated. Then, based on the normal vector at the collision point, the combination data may be modified into an optimal shape, thereby to render and provide a last virtual reality image frame to the user. This process will be explained in description of FIG. 2.

Further, the server 100 may perform a function of combining image direction data as meta information with a generated VR image. The image direction data may be data regarding a direction in a three-dimensional space of an image frame generated by the server 100.

Further, the server 100 may receive reproduction direction data from the client 200. The server 100 may determine the image direction data to be combined with the image frame as the received reproduction direction data and may generate a VR image frame corresponding to the reproduction direction data (or the image direction data).

The client 200 receives and reproduces image data corresponding to the virtual reality image. That is, the client 200 reproduces the VR image data received from the server 100 and presents the reproduced VR image data to a wearer thereof. The client 200 may be a VR device itself, or may be a combination of a mobile terminal and the VR device. For example, when the VR device and the mobile terminal are combined to each other to form the client 200, the mobile terminal may receive the image data generated from the server 100, and transfer an image frame to the VR device connected thereto via a cable or via short-range wireless communication, and may display the image frame on a screen.

The VR device may be configured in various forms. For example, the VR device may display an image frame including images suitable for both eyes respectively on one display unit, and may generate a 3D image using each fish-eye lenses facing each of the both eyes. Further, in another embodiment, the VR device may include two display units that respectively display two images corresponding to both eyes.

Further, the client 200 may serve to measure the reproduction direction data. The reproduction direction data may be data regarding a direction of an image frame to be reproduced on the screen of the client 200 at a specific time-point. That is, the client 200 may measure a direction in which the wearer wearing the client 200 on both eyes thereof faces and may determine the measured direction as the reproduction direction data. For example, the reproduction direction data may include angle-of-elevation data, azimuth data, or tilt data. The client 200 is equipped with one or more sensors, for example, a gyro sensor, an acceleration sensor, a geomagnetic sensor, etc., to detect movement of a head of the user wearing the client 200 to measure the angle-of-elevation data, the azimuth data, the tilt data, etc. Further, the client 200 may perform a function of transmitting the measured reproduction direction data to the server 100 via wireless communication.

The angle-of-elevation data may mean an angle formed between a horizontal plane, for example, a horizon and the line-of-sight direction of the client 200. That is, the angle-of-elevation data may be an angle defined between the horizontal plane and the line-of-sight direction of the client according to a vertical movement of the head of the user.

The azimuth data may refer to an angle indicating an orientation, and may mean an angle by which a head rotates from a specific reference direction on a horizontal plane. That is, the azimuth data may be changed when the head rotates around a body or a neck of the user.

The tilt data may mean an angle by which the head rotates from an exact front direction of the user as an axis. That is, the tilt data may be changed by the head movement of the user in a right and left direction or by a rotation of an entire body of the user.

Further, the client 200 may measure movement of the wearer. For example, when performing virtual simulation training or game, the user wears the client 200 and moves. In this case, the client 200 may request, to the server 100, an image frame corresponding to a displaced position based on the measured movement amount of the user. Further, when the image frame at a specific time-point corresponding to the user movement amount is not received as described later, the client 200 may perform correction of the image frame based on the movement amount of the user for a duration between adjacent image frame transmission periods.

Further, the image frame may be received via wireless communication. However, when a specific image frame is not received by the client 200 via wireless communication, the client 200 may correct a previously received image frame to be adapted to the user movement amount and display the corrected image frame on the screen. That is, when the client 200 does not receive a last image frame at a second time-point, the client 200 may calculate a difference between the image direction data corresponding to the first time-point and the reproduction direction data corresponding to the second time-point, and may correct the last image frame at the first time point based on the difference. The second time-point may be a time-point spaced from the first time-point by a transmission period of the last image frame. The server 100 and the client 200 may be connected to each other via wireless communication. The wireless communication may include Wi-Fi, cellular communication, or the like. For example, when the server 100 is a computer present in a specific space, for example, a house, a virtual reality experience space, etc. in which the user is positioned, the communication between the client 200 and the server 100 may be performed via a wireless AP, for example, Wi-Fi AP. Further, for example, when the server 100 is a computer remote from the user, the remote server 100 may transmit the generated image frame to the client 200 via cellular communication or LAN communication. The client 200 may receive the image frame from a base station via cellular communication or the image frame from a wireless AP via WLAN. In this way, when the user carries the client 200 capable of performing the wireless communication, the client 200 may receive and use the VR image provided from the server 100 although the server 100 is remote from the computer.

Hereinafter, a method and a program for providing a virtual reality image according to embodiments of the inventive concept will be described with reference to the drawings.

Figure 2:
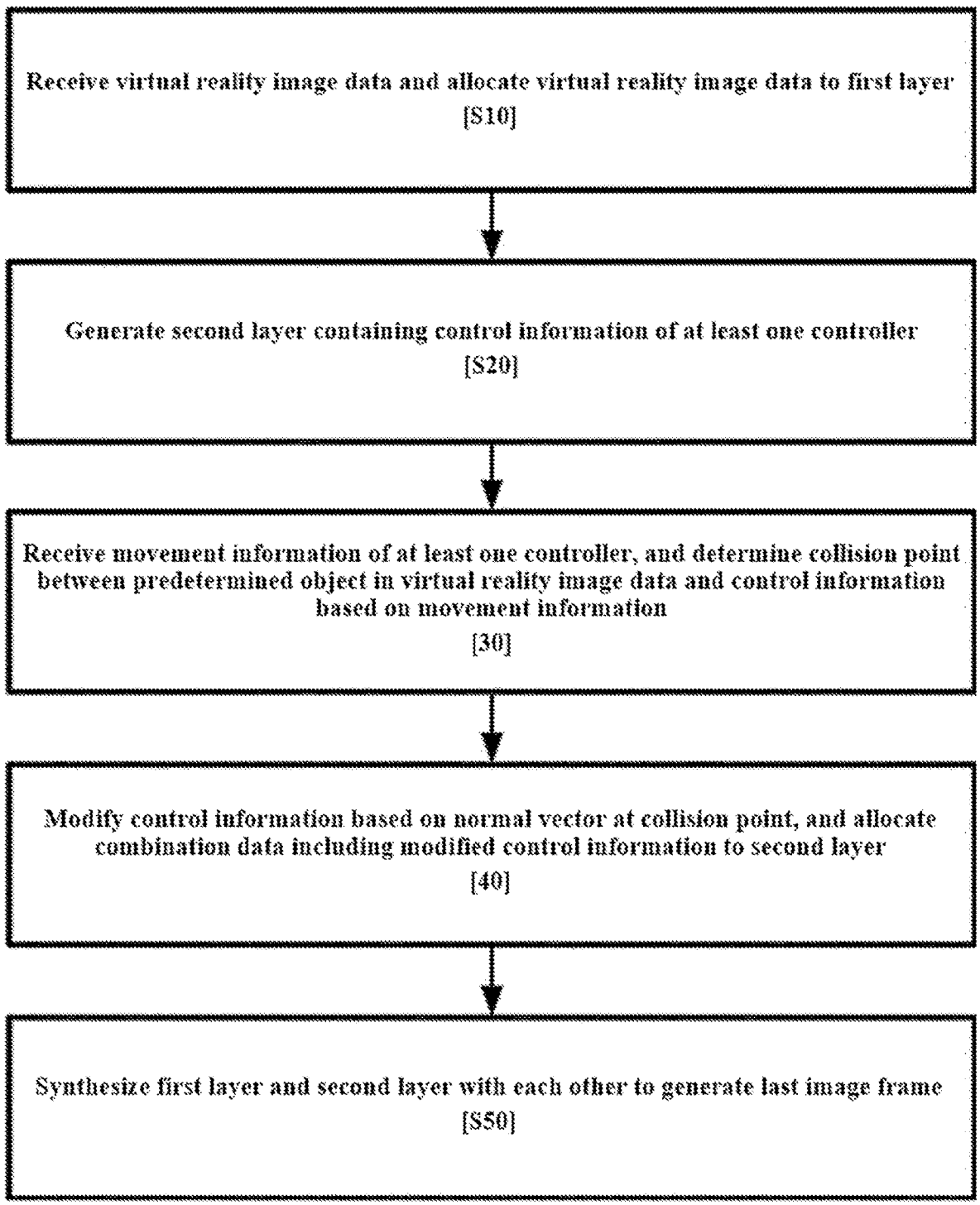
FIG. 2 is a flow chart of a method for providing a virtual reality image according to an embodiment.

FIG. 2 is a flow chart for a virtual reality image transmission method according to an embodiment of the inventive concept.

In operation S10, the client 200 receives virtual reality image data from the server 100 and allocates the data to a first layer.

Further, the client 200 may divide the virtual reality image data into a plurality of overlay elements and thus receive the plurality of overlay elements via separate channels, respectively. Then, the client 200 may combine the plurality of overlay elements received via the separate channels with each other and may allocate the combination thereof to each of a plurality of first layers.

Therefore, the server 100 does not need to transmit the overlay elements as an entire image, but may transmit the same as multiple images (for example, an energy bar may be transmitted as an upper right image, an item list may be transmitted as a bottom image, etc.).

Each overlay element may be separately compressed. Further, each overlay element should have (x, y) coordinates to be presented on the screen of the client 200. When each overlay element has information about a z-order (information about a depth), the overlay elements may be allocated to different layers, respectively. Therefore, whenever a corresponding overlay element needs to be updated, the server 100 may transmit only the corresponding element to the client 200. In this way, as described later, the determination of the collision point may be performed in real time while the client 200 receives only data within a specific range.

In operation S20, the client 200 generates a second layer that displays the control information of at least one controller. The second layer includes at least one graphic user interface (GUI). The control information of the controller may include image data of the controller in the virtual reality image, an image indicating a direction indicated by the controller, and an image (e.g., crosshair) indicating a point where the controller collides with an object in the virtual reality image.

In a method for providing the virtual reality image according to an embodiment, the control information such as a mouse cursor or a crosshair may be displayed to indicate a movement under control of the controller. In order to minimize delay of a network so that content responds to the user movement immediately, the control information is allocated to a separate layer.

In one example, in order to display the control information together on the virtual reality image, it is necessary to reflect interacting between the control information and the object in the virtual reality image.

Figure 3:
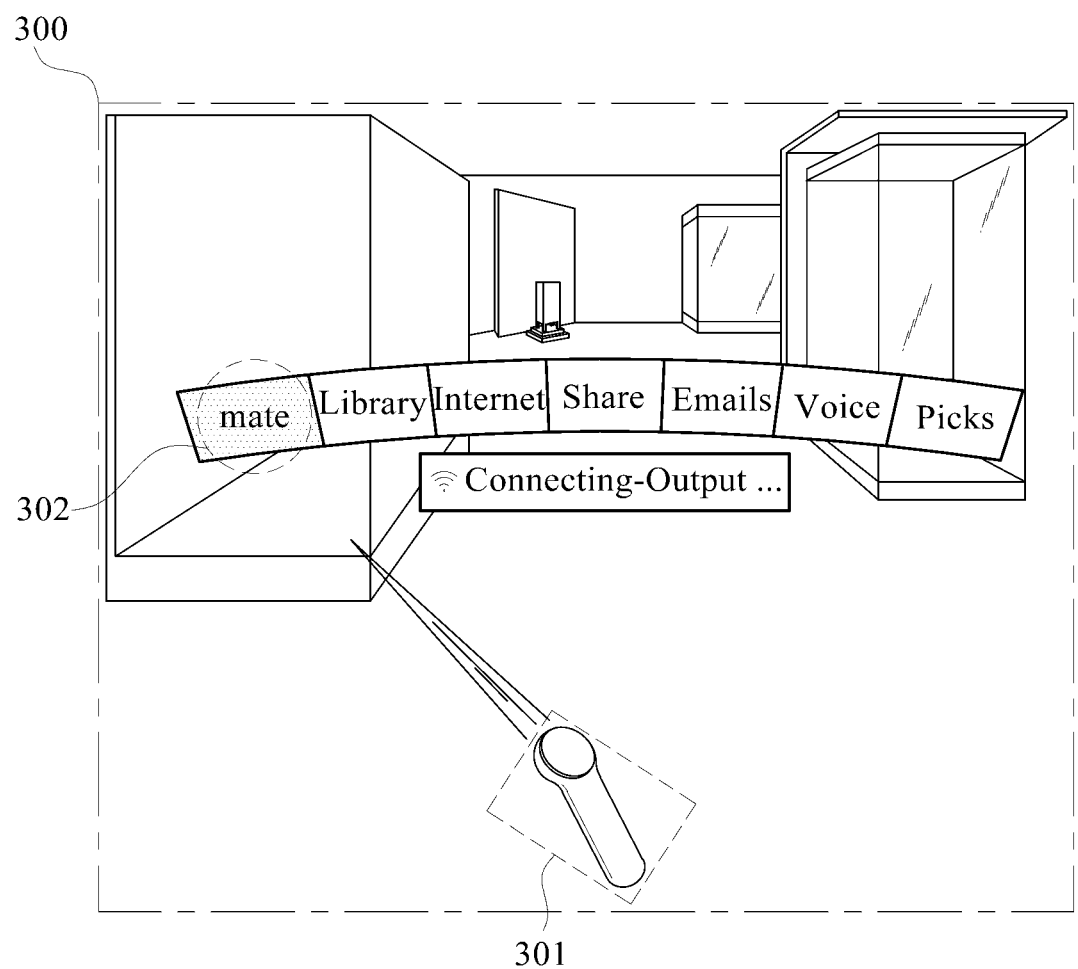
FIG. 3 is a diagram showing an example of displaying control information on a virtual reality image according to an embodiment.

For example, referring to FIG. 3, in order to accurately indicate what the controller is currently pointing to in the virtual reality image 300, the control information (pointer) 302 may be displayed immediately above a point indicated by the controller image 301 and the controller. However, the inventive concept is not limited to this configuration. Displaying the pointer image in a center of the line-of-sight may allow the user to have more comfortable immersion into the VR image. In one example, content objects on which a pointer according to one embodiment will be displayed exist on the server 100. Thus, in order to implement this displaying via the network, the client 200 may directly allocate the controller and the pointer to a separate layer, while the point where the image data transmitted from the server and the pointer collide with each other may be determined by the server 100 or the client 200 and may be considered.

Referring back to FIG. 2, in operation S30, movement information of at least one controller is received by the client 200. Based on the movement information, a collision point between a predetermined object and the control information in the virtual reality image data may be determined. In this connection, the controller may include a controller such as a mouse, a joystick, or HMD (head mounted device). The movement information of the controller may include information about a position of the controller and a direction indicated by the controller.

According to one embodiment, the collision point and the normal vector may be determined by the client 200.

The server 100 transmits an overlay element including an object for which a collision point is to be determined, to the client 200 via a first channel. The client 200 may calculate the collision point using the received overlay element. Further, the client 200 may determine the normal vector at the collision point. In this connection, the server 100 may transmit only an overlay element necessary for calculating the collision point to the client 200 via a separate channel. Thus, the client 200 may calculate the collision point using relatively small resources.

According to another embodiment, the collision point and the normal vector may be determined by the server 100 and then may be transmitted to the client 200.

The client 200 may transmit the movement information of the controller to the server 100. Then, the server 100 may determine a point at which the object in the virtual reality image collides with the controller, based on the received movement information of the controller, and then determine the normal vector at the collision point. The server 100 transmits, to the client 200, the movement information of the controller used to calculate the collision point, a position on a direction line indicated by the controller at which the controller collides with the object, and the normal vector to the object at the collision position.

According to another embodiment, the server 100 may transmit, to the client 200, the position information of the controller used to calculate the collision point, a position on a direction line indicated by the controller at which the controller collides with the object, and the normal vector to the object at the collision position. Delay in presenting the movement of the controller and pointer as a factor that directly reflects the user movement may significantly reduce user immersion. However, delay in presenting in a distance between the controller and the pointer and the pointer direction as a factor related to an indirect response to the user movement may insignificantly affect the user immersion. Thus, the user immersion to the VR image may be maintained even when the collision calculation is performed by the server.

In operation S40, the client 200 may allocate, to a second layer, at least one combination data including the control information as modified based on the normal vector at the collision point.

In operation S50, the client 200 may synthesize the first layer and the second layer to generate the last image frame.

Figure 4:
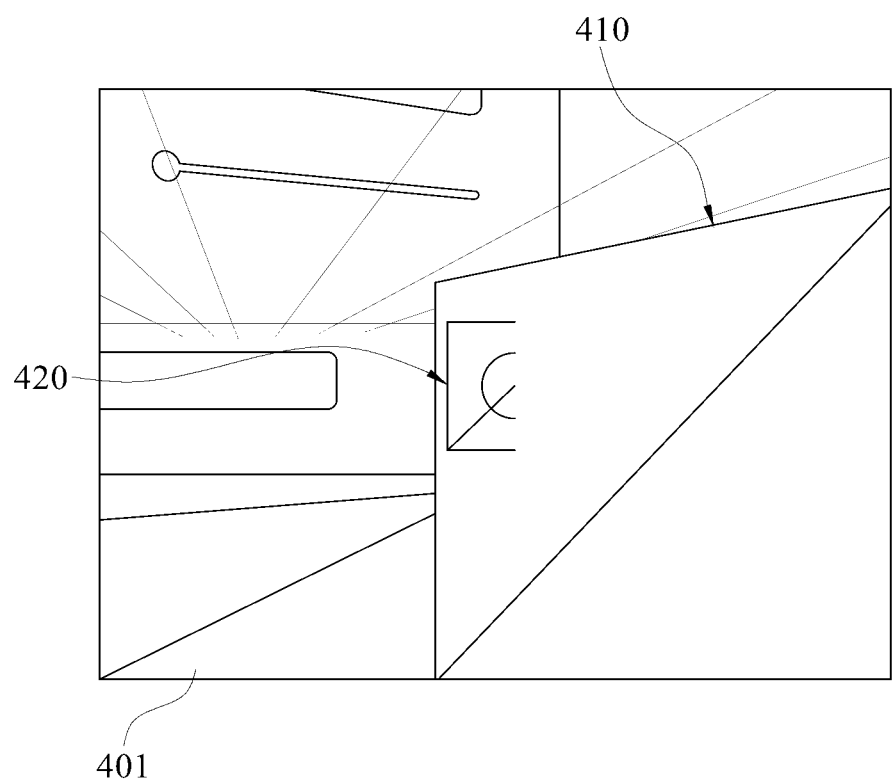
FIG. 4 and FIG. 5 are diagrams showing an example of using a normal vector according to an embodiment.
Figure 5:
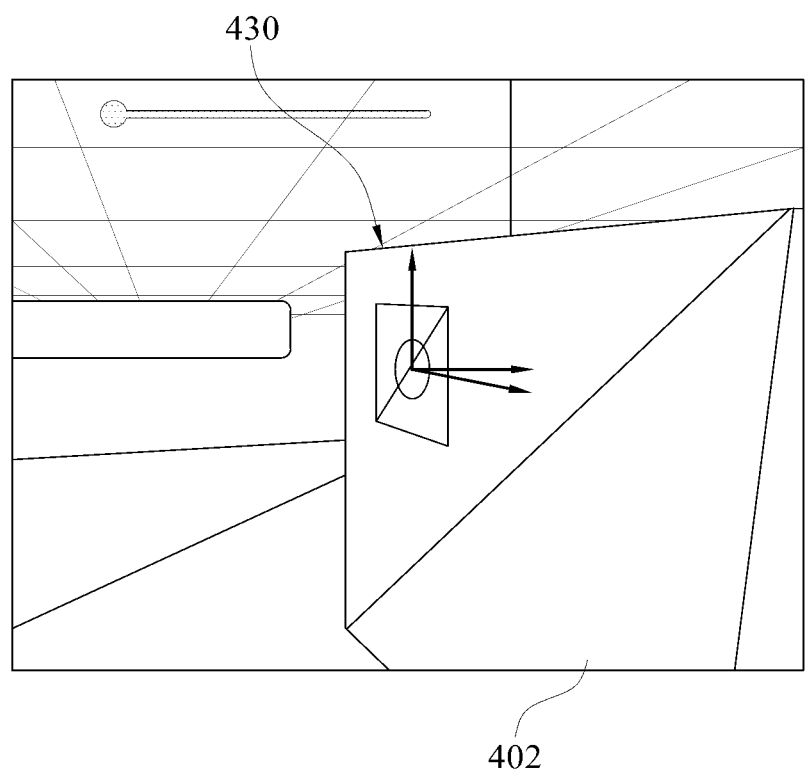

FIG. 4 and FIG. 5 explain why the normal vector is needed to display the control information.

Referring to FIG. 4, a virtual reality image 401 is shown in which a pointer image 420 is displayed on an object 410 while not considering the normal vector. Further, referring to FIG. 5, a virtual reality image 402 is shown in which the pointer image 430 is displayed on the object while considering the normal vector. That is, when using the normal vector, an orientation state (horizontal or tilted orientation) of the object to be combined with the image in the virtual reality image may be grasped. In one example, FIG. 5 shows a rectangular object by way of example. However, when the object has a curved surface, information for grasping the curved surface may be additionally considered (for example, multiple position data in one area and normal vector at each point may be received from the server).

Figure 6:
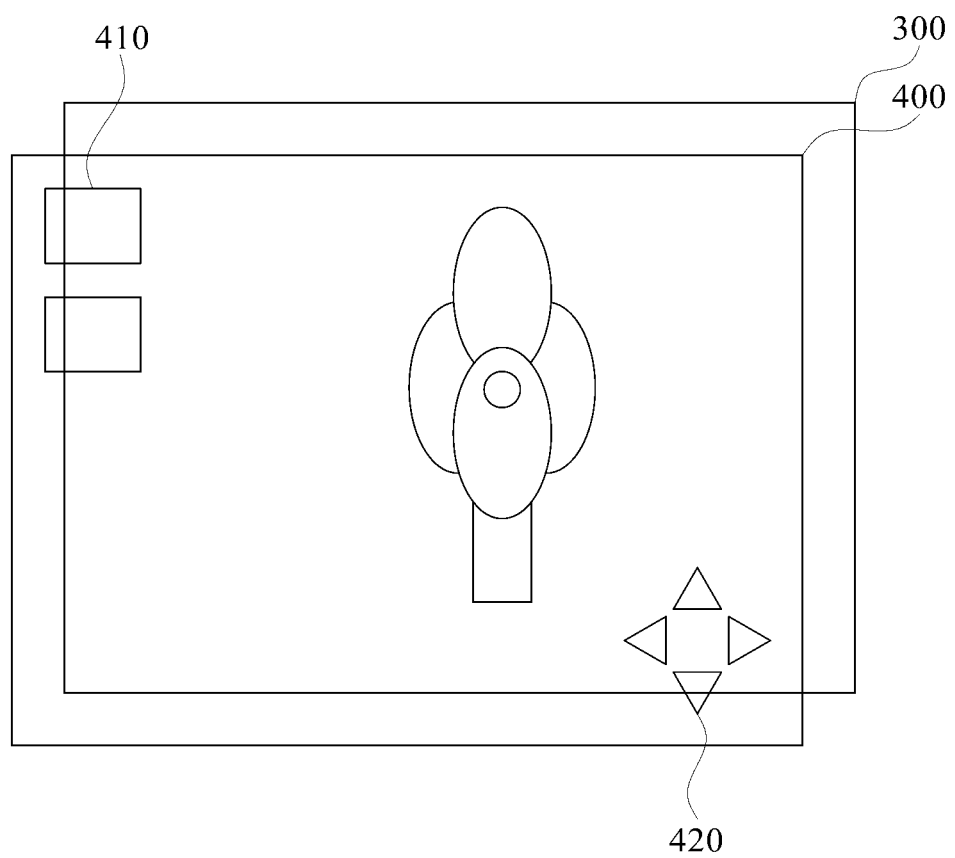
FIG. 6 is a diagram showing a reproduction method of a virtual reality image including a first layer and a second layer according to an embodiment.

FIG. 6 is a diagram showing a reproduction method of a virtual reality image including a first layer and a second layer according to an embodiment.

FIG. 6 shows a first layer 300 in which the image frame received from the server is contained, and a second layer 400 in which at least one graphic user interface 410 and control information 420 are contained.

The image frame contained in the first layer 300 is changed on each transmission period basis for which the image frame is transmitted from the server 100 to the client 200.

The at least one graphic user interface 410 and the control information 420 contained in the second layer 400 are used to control the client 200 or an application corresponding to an image displayed on the client 200, or to display information corresponding to an image displayed on the client 200.

For example, the at least one graphic user interface 410 and the control information 420 may include at least one user interface to control reproduction of an image displayed on the client 200 or to display information corresponding to the image.

In another example, the at least one graphic user interface 410 and the control information 420 may include at least one user interface for displaying information corresponding to a game displayed on the client 200 or corresponding to manipulation of the game.

When the client 200 moves together with the user movement, the image frame contained in the first layer 300 is changed to an image frame corresponding to the reproduction direction data and the image direction data as determined based on a position or a direction of the client 200. However, a position of the graphic user interface contained in the second layer 400 may not be changed and may be moved along with the user line-of-sight.

Similarly, according to the disclosed embodiment, the image frame at the first time-point is contained in the first layer 300. Then, when the image frame at the second time-point spaced from the first time-point by the transmission period of the image frame is not received by the client 200, the client 200 calculates the difference between the image direction data corresponding to the first time-point and the reproduction direction data corresponding to the second time-point, and corrects the first image frame based on the difference to generate a second alternative image frame.

In one example, both of an image frame and a graphic user interface may be contained in a single layer. In this case, when the first image frame is corrected according to the embodiment, the graphic user interface displayed on the first image frame is moved or rotated, so that the user may feel uncomfortable.

Therefore, according to an embodiment shown in FIG. 6, the image frame is allocated to the first layer 300, and the graphic user interface 410 and the control information 420 is allocated to the second layer 400, such that the inconvenience caused by the image frame correction is removed.

Specifically, the client 200 allocates the generated second alternative image frame to the first layer 300 and displays the same.

On the other hand, as the second layer 400 is generated from the client 200, there is no delay or omission thereof. Further, since positions of the graphic user interface 410 and the control information 420 contained in the second layer 400 are not changed within a single frame, no correction needs to be made to a frame allocated to the second layer 400.

Therefore, the client 200 may synthesize the first layer 300 including the second alternative image frame as corrected and the second layer 400 as not corrected, thereby to generates the last image frame, and then may display the generated last image frame.

The client 200 may receive information for generating the graphic user interface 410 and the control information 420 contained in the second layer 400 from the server 100, or may directly obtain the same.

Even when the client 200 receives the information from the server 100 and generates the graphic user interface 410 and the control information 420 based on the received information, an amount of the information required to generate the graphic user interface 410 and the control information 420 is very small compared to an amount of information contained in the image frame allocated to the first layer 300. Further, unlike the image frame allocated to the first layer 300, the graphic user interface 410 and the control information 420 may not be changed immediately when the client 200 moves or as the time elapses. Thus, the first layer 300 and the second layer 400 may be processed in a separate manner, thereby to achieve easy image correction. Further, the inconvenience of the user may be prevented which may otherwise occur when the graphic user interface is also corrected in the correction process of the image frame according to the disclosed embodiment.

Figure 7:
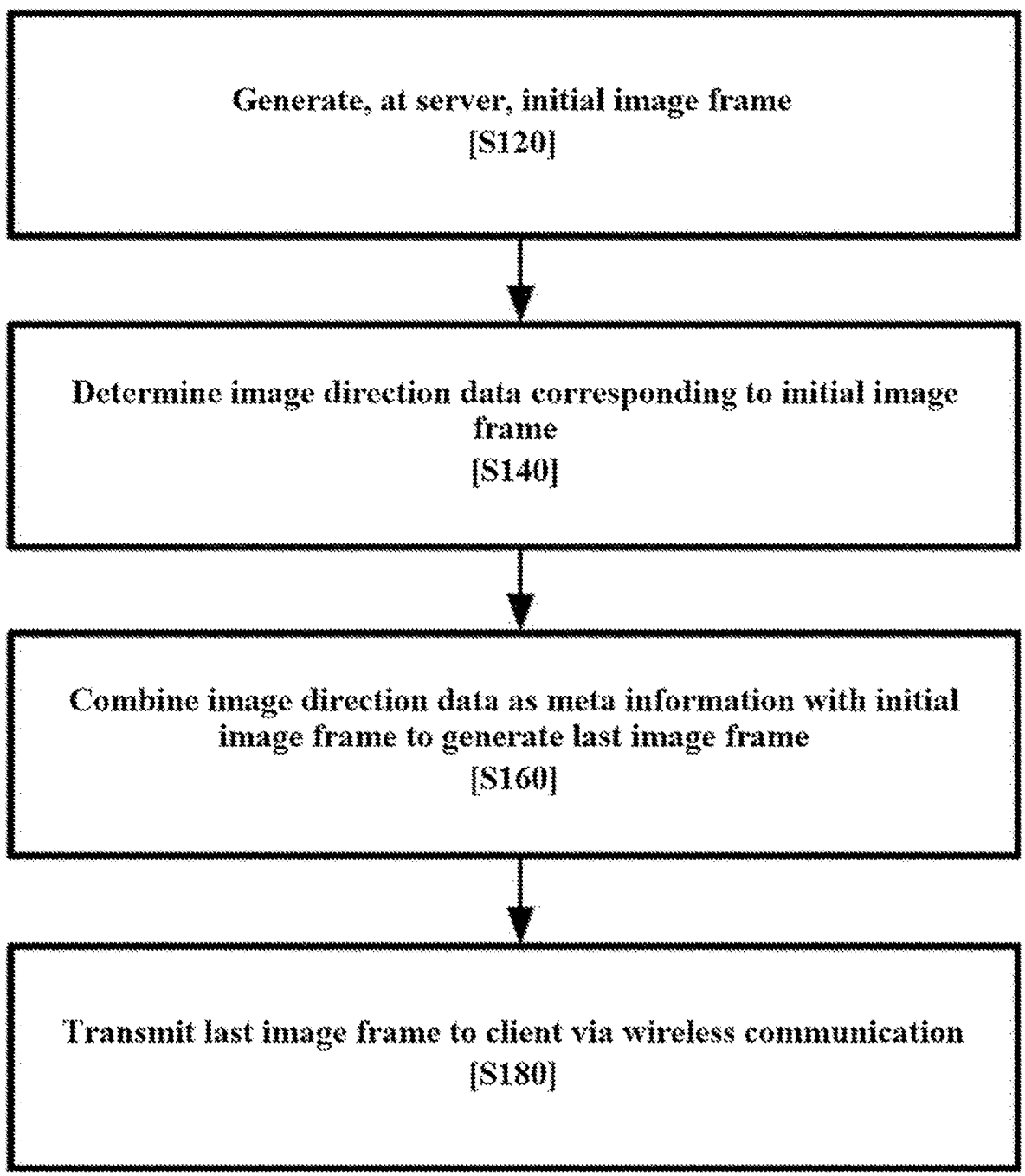
FIG. 7 is a flow chart for a virtual reality image transmission method according to an embodiment of the inventive concept.

FIG. 7 is a flow chart for a virtual reality image transmission method according to an embodiment.

Referring to FIG. 7, the virtual reality image transmission method according to an embodiment of the inventive concept includes operation S120 in which the server 100 generates an initial image frame, operation S140 in which the server 100 determines image direction data corresponding to the initial image frame, operation S160 in which the server 100 combine the image direction data as meta information with the initial image frame to generate the last image frame, and operation S180 in which the server 100 transmits the last image frame to the client 200 via wireless communication.

The server 100 generates an initial image frame S120. The server 100 may generate the initial image frame by executing a program installed therein. The initial image frame is transmitted to the client 200 and is not subjected to information processing for compensation for a situation when a specific image frame is not received. For example, the server 100 may generate a game image frame by executing a game program.

The server 100 determines image direction data corresponding to the initial image frame S140. The image direction data indicates a direction of an image frame generated by the server 100 in a three-dimensional space. The image direction data may be determined before the image is generated by the server 100 (for example, when an image of a specific direction is requested, a direction of an image to be generated may be determined, and then a corresponding initial image frame thereto may be generated). After generation of the image frame, a corresponding image direction data thereto may be determined.

The server 100 combines the image direction data as meta information with the initial image frame to generate the last image frame S160. Then, the server 100 transmits the last image frame to the client 200 via wireless communication S180. That is, the server 100 may transmit the last image frame as a combination of the image direction data and the initial image frame to the client 200, such that the client 200 determines the direction corresponding to the image frame or correct the image frame corresponding to the previous time-point, that is, the first time-point when the client 200 does not receive an image frame corresponding to a next transmission time-point, that is, a second time-point image frame.

The client 200 may not receive, from the server 100, the last image frame corresponding to the second time-point due to poor communication status, etc. In this case, the client 200 may calculate a difference between the image direction data corresponding to the first time-point and the reproduction direction data corresponding to the second time-point, and then may correct the last image frame corresponding to the first time-point based on the difference. The second time-point may be a time-point spaced from the first time-point by a transmission period of the last image frame.

Further, the method may further include operation S110 for receiving the reproduction direction data from the client 200. For example, when the wearer wearing the client 200 moves, the client 200 may obtain data (e.g., data regarding the user head movement) regarding the image frame direction to be provided to the user on the screen at a specific time-point, and may transmit the obtained data to the server 100. The data measured by the client 200 may be referred to as the reproduction direction data. The server 100 may determine the image direction data based on the reproduction direction data received from the client 200 in the image direction data determination operation S120. That is, the server 100 may determine a direction corresponding to the reproduction direction data received from the client 200 as a direction of an image to be generated. Accordingly, the server 100 may set the reproduction direction data received from the client 200 as the image direction data S120, and may generate the initial image frame S100 corresponding to the set image direction data.

Further, the last image frame generation operation S160 may further include converting the last image frame to each image frame for each of both eyes. In order to provide a 3D image, a difference between a left-eye image and a right-eye image may be required. Therefore, the server 100 may generate the last image frame to be transmitted to the client 200 as the last image frame for the left eye and the last image frame for the right eye, respectively.

Further, the last image frame generation operation S160 may further include modifying the last image frame so as to have a size corresponding to the screen of the client 200. That is, the server 100 may adjust a size of the image frame to the size of the screen of the client 200 so that the client 200 may receive the last image frame and reproduce the same immediately. Thus, it is possible to minimize a time delay that may otherwise occur in a process in which the client 200 having lower information processing ability than that of the server 100 modifies the last image frame so as to have a size corresponding to the screen of the client 200.

Figure 8:
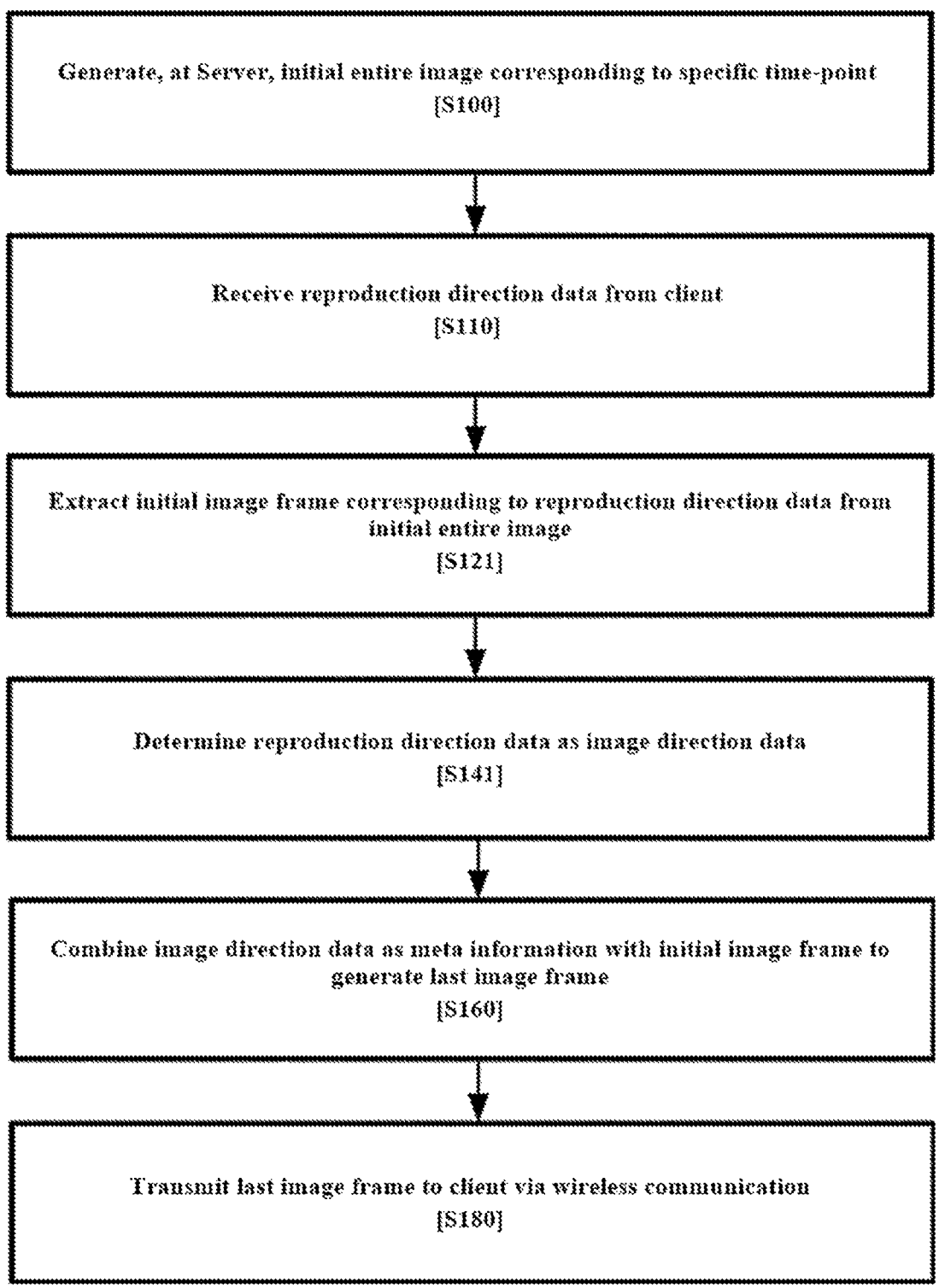
FIG. 8 is a flow chart for a transmission method of a virtual reality image frame generated based on an initial entire image according to an embodiment of the inventive concept.

FIG. 8 is a flow chart for a transmission method of the virtual reality image frame generated based on an initial entire image according to another embodiment of the inventive concept.

The virtual reality image transmission method according to another embodiment of the inventive concept includes operation S100 in which the server 100 generates the initial entire image corresponding to a specific time-point, operation S110 in which the server 100 receives the reproduction direction data from the client 200, operation S121 in which the server 100 extracts the initial image frame corresponding to the reproduction direction data from the initial entire image, operation S141 in which the server 100 determines the reproduction direction data as image direction data, operation S160 in which the server 100 combines the image direction data as meta information with the initial image frame to generate the last image frame, and operation S180 in which the server 100 transmits the last image frame to the client 200 via wireless communication. Hereinafter, detailed description of the previously described operations will be omitted.

The server 100 acquires the initial entire image corresponding to the specific time-point S100. The initial entire image may mean an image including image frames in all directions of the line-of-sight of the user. In other words, the server 100 may generate the entire image corresponding to the specific time-point by executing a specific program therein and may extract the entire image corresponding to the specific time-point from an entire image (e.g., an entire image as captured for a certain time duration by a 360-degree camera) as previously generated for a predetermined time duration.

The server 100 receives the reproduction direction data from the client 200 S110.

The server 100 extracts the initial image frame corresponding to the reproduction direction data from the initial entire image S121. That is, the server 100 may determine a direction in which the image frame is requested based on the reproduction direction data received from the client 200, and may extract the initial image frame corresponding to the reproduction direction data from the initial entire image.

The server 100 determines the reproduction direction data as the image direction data S141. In other words, because the extracted initial image frame is an image frame having a direction corresponding to the reproduction direction data, the server 100 may set the reproduction direction data received from the client 200 as the image direction data of the extracted initial image frame.

The server 100 combines the image direction data as meta information with the initial image frame to generate the last image frame S160. The server 100 transmits the last image frame to the client 200 via wireless communication S180.

Figure 9:
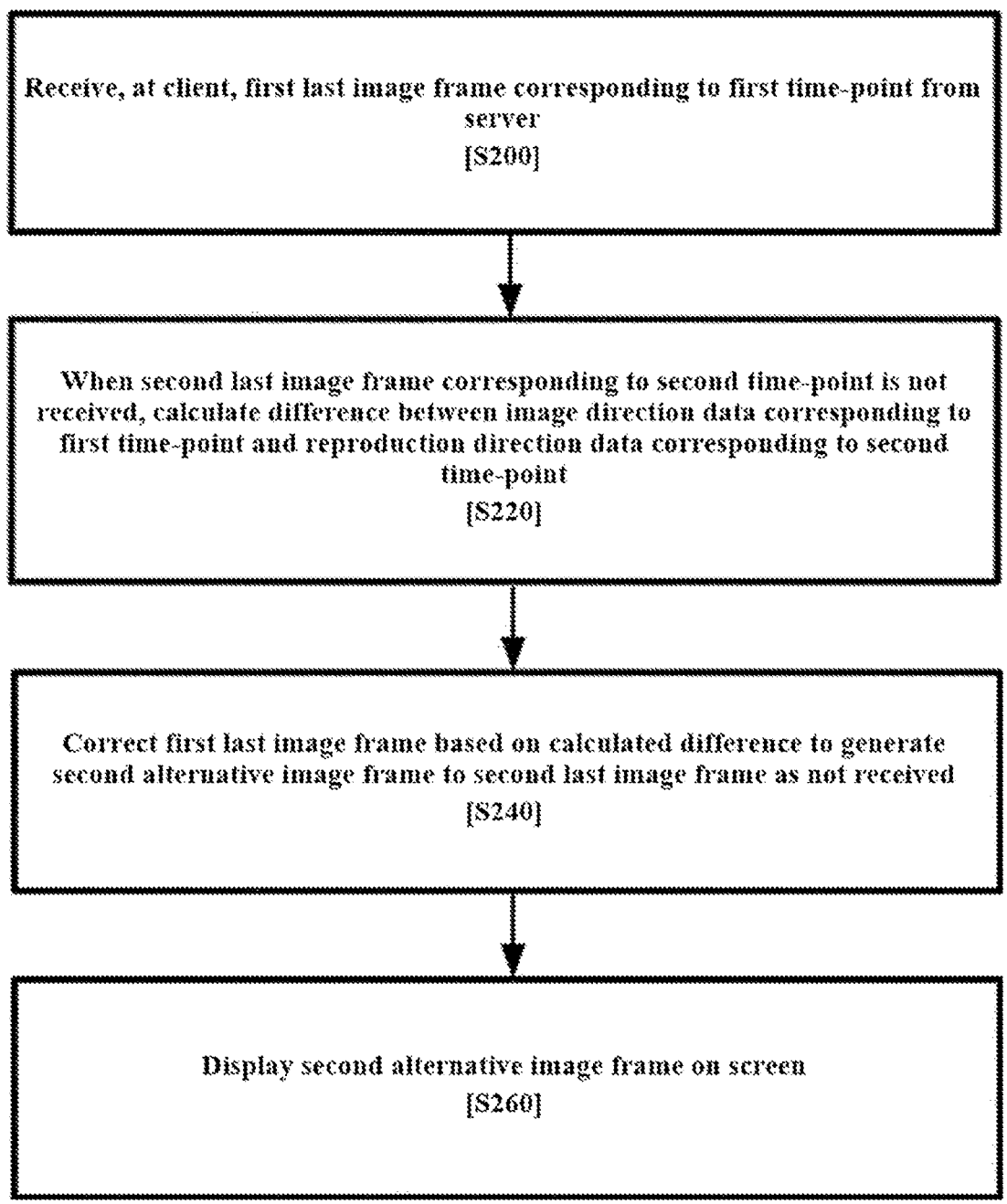
FIG. 9 is a flow chart for a virtual reality image reproduction method by a client according to an embodiment of the inventive concept.

FIG. 9 is a flow chart for a virtual reality image reproduction method by the client 200 according to another embodiment of the inventive concept.

The virtual reality image reproduction method according to another embodiment of the inventive concept includes operation S200 in which the client 200 receives the first last image frame corresponding to the first time-point from the server 100, operation S220 in which, when the second last image frame corresponding to the second time-point is not received, the client 200 calculates the difference between the image direction data corresponding to the first time-point and the reproduction direction data corresponding to the second time-point, operation S240 in which the client 200 corrects the first last image frame based on the calculated difference to generate the second alternative image frame to the second last image frame as not received, and operation S260 in which the client 200 displays the second alternative image frame on the screen.

The client 200 receives the first last image frame corresponding to the first time-point from the server 100 S200. That is, the client 200 may receive the first last image frame having the image direction data as meta information from the server 100 via wireless communication. The image direction data is data about a direction of the image frame obtained by the server 100 in the 3D space. The last image frame may be an image frame having the image direction data as meta information as obtained by the server 100.

Figure 10:
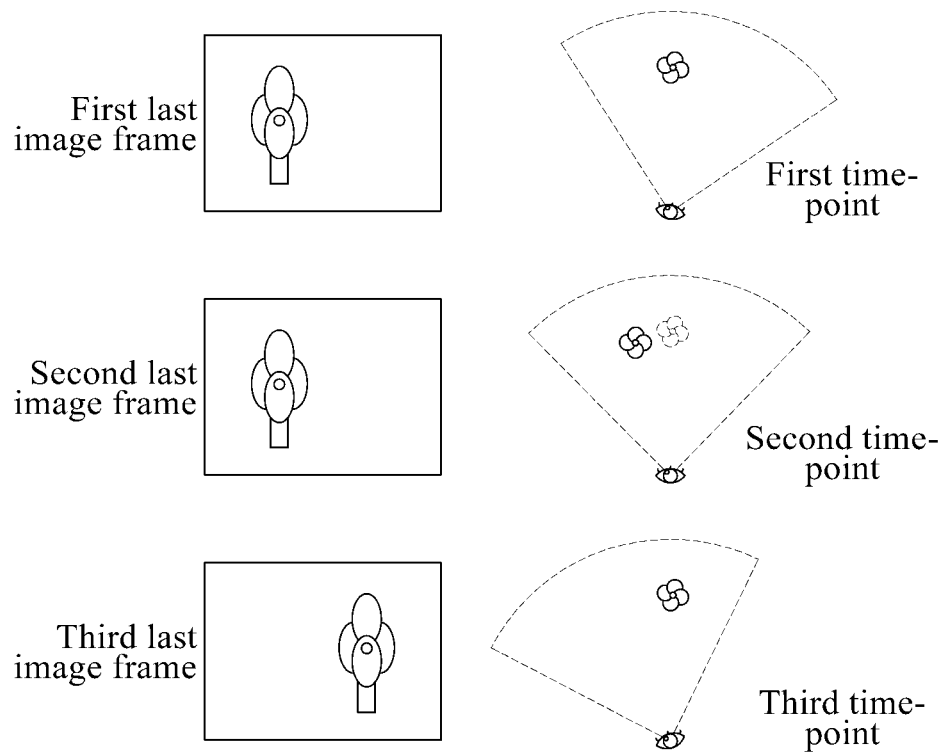
FIG. 10 shows an exemplary drawing showing change of an image to be provided to a user via a client when a second last image frame is missing and no second alternative image frame is provided.

When the client 200 does not receive the second last image frame corresponding to the second time-point, the client 200 calculates the difference between the image direction data corresponding to the first time-point and the reproduction direction data corresponding to the second time-point S220. The second time-point may be a time-point spaced from the first time-point by a transmission period of the last image frame. After receiving and displaying the first last image frame corresponding to the first time-point, and then, after, the transmission period of the last image frame has lapsed, the client 200 may not receive the second last image frame may due to a reason such as a poor communication state at the second time-point. In this case, as the client 200 keeps on displaying the first last image frame instead of the second last image frame expected at the second time-point, the user feels object shake due to the difference between the reproduction direction data of the second time-point and the image direction data of the first last image frame. That is, after continuously displaying the first last image frame corresponding to the first time-point at the second time-point, and then receiving a new last image, that is, a third last image frame at a third time-point, that is, a time-point spaced from the second time-point by the transmission period of the last image frame, the user feels a phenomenon in which the object moves or shakes unnaturally as a current image frame changes directly from the first last image frame to the third last image frame shown in FIG. 10, and, thus, an object position corresponding to the first time-point is directly changed to an object position corresponding to the third time-point while the position of the object corresponding to the second time-point is bypassed. When this phenomenon continues to occur, the user may feel sickness. To solve this problem, the client 200 needs to generate an image frame alternative to the missing second last image frame. Therefore, the client 200 may modify the first last image frame received at the first time-point to generate an image frame corresponding to the second time-point, that is, the second alternative image frame.

The client 200 needs to determine a correction amount in order to convert the first last image frame into the image frame corresponding to the second time-point. To this end, the client 200 may calculate a difference between the image direction data corresponding to the first time-point and the reproduction direction data corresponding to the second time-point. The reproduction direction data may refer to data regarding the direction of the image frame to be reproduced on the screen of the client 200 at a specific time-point. The reproduction direction data may be measured using a sensor disposed in the VR device, for example, a gyro sensor, a geomagnetic sensor, or an acceleration sensor. For example, when client 200 receives the image frame including the image direction data corresponding to the reproduction direction data from the server 100 and provides the same to the user, the client 200 may calculate the difference between the second reproduction direction data corresponding to the direction in which the image frame should be reproduced and the first image direction data corresponding to the direction of the first last image frame, and may determine the difference as a value to be used to correct the first last image frame.

The reproduction direction data and the image direction data may include angle-of-elevation data and azimuth data. The client 200 may calculate a difference between an angle-of-elevation of the reproduction direction data corresponding to the second time-point and an angle-of-elevation of the image direction data corresponding to the first time-point, and a difference between an azimuth of the reproduction direction data corresponding to the second time-point and an azimuth of the image direction data corresponding to the first time-point.

Further, the reproduction direction data and the image direction data may include tilt data as an angle by which the wearer rotates from an exact front direction as an axis. The client 200 may calculate a difference between a tilt of reproduction direction data corresponding to the second time-point and a tilt of the image direction data corresponding to the first time-point.

The client 200 corrects the first last image frame based on the calculated difference to generate the second alternative image frame that replaces the second last image frame that has not been received S240. In one embodiment, the client 200 may displace the first last image frame based on the difference. That is, the client 200 may displace the first last image frame in a vertical direction by the difference of the angle-of-elevation and may displace the first last image frame in a horizontal direction by the difference of the azimuth. Further, the client 200 may rotate the first last image frame by the difference of the tilt. When the user tilts the head in a specific direction with respect to an exact front direction as an axis, an object visible to the user rotates, and, thus, the first last image frame may be rotated by the difference between the tilt of the image direction data corresponding to the first time-point and the tilt of the reproduction direction data corresponding to the second time-point.

Figure 11:
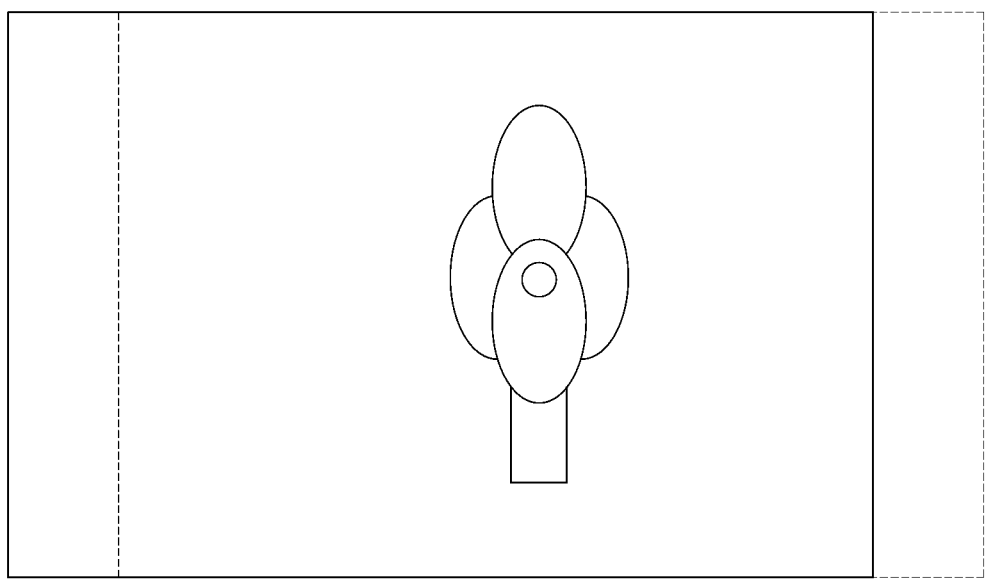
FIG. 11 is an exemplary drawing of a second alternative image frame generated based on a difference between an image direction data of a first time-point and a reproduction direction data of a second time-point by a client according to an embodiment of the inventive concept.

When the client 200 corrects the first last image frame based on the difference, a blank area is generated on the second alternative image frame to be provided to the user, as shown in FIG. 11. The blank area may be presented in a black or white or in a combination of similar colors so that the wearer visually perceives the area in a minimal manner.

The client 200 displays the second alternative image frame on the screen S260. That is, the client 200 may display the second alternative image frame as obtained via the correction of the first last image frame, on the screen in place of the second last image frame missing at the second time-point.

Figure 12:
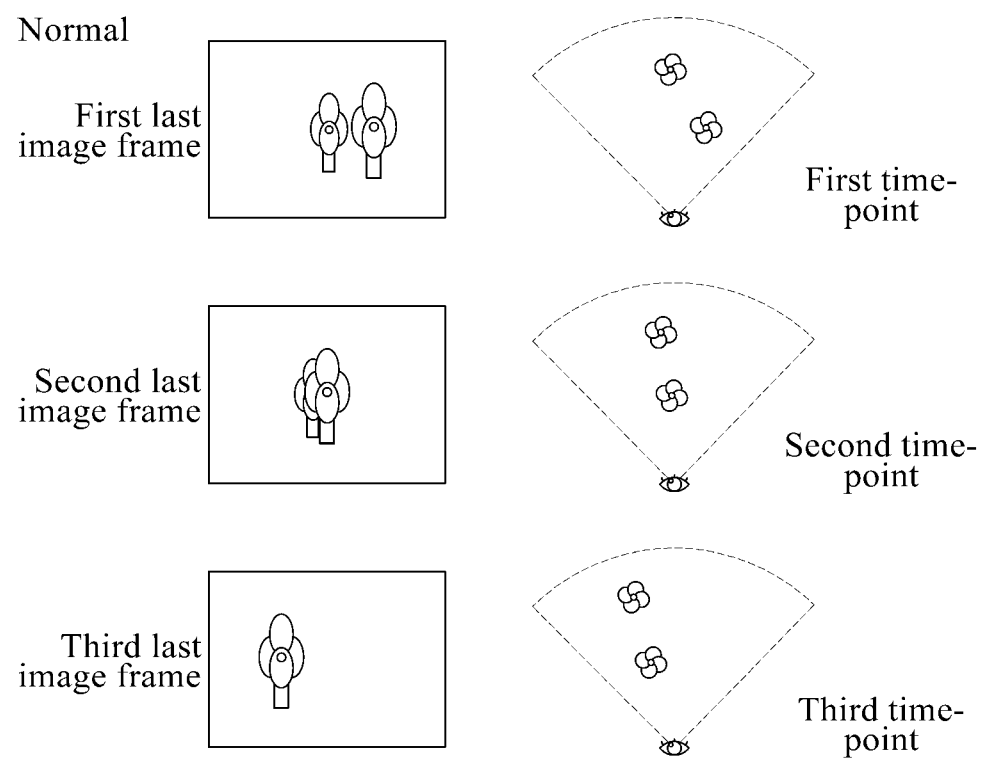
FIG. 12 is an exemplary diagram showing change in an object position as a last image frame is provided in sequence without a missing frame when a client moves.
Figure 13:
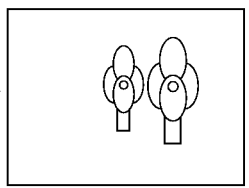
FIG. 13 is an exemplary diagram for providing a second alternative image frame obtained by correcting each object position in a first last image frame based on a movement amount of a client according to an embodiment of the inventive concept.
Figure 13:
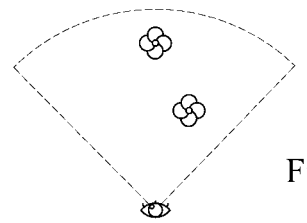
Figure 13:
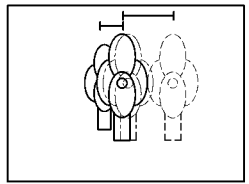
Figure 13:
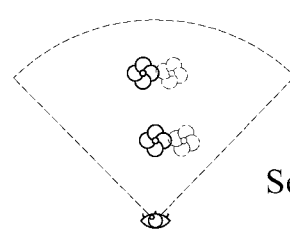
Figure 13:
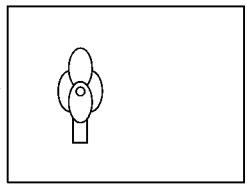
Figure 13:
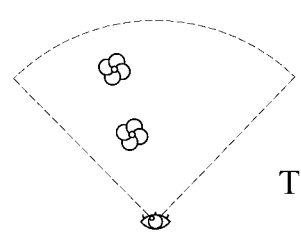

Further, when the user moves while wearing the client 200, the client 200 determines the user movement information (e.g., a movement distance, and a movement direction, number of walks, etc.). When the last image frame corresponding to the second time-point is not received, the first last image frame may be corrected to comply with the user movement information. In one embodiment, when the user moves, objects have different displacements based on spacings between the objects and the user. As shown in FIG. 12, an object that is closer to the user displaces in a larger amount according to the user movement. An object that are farther away from the user displaces in a smaller amount according to the user movement. Therefore, the difference between the displacement amounts of the objects based on the spacings between the objects and the user should be applied to the virtual reality image, thereby to provide better reality to the user. To this end, the server 100 may generate the last image frame based on the spacing information (hereinafter, depth information) between the objects (each object being presented as a set of pixels within the image frame) and the client as meta information, and transmit the last image frame to the client 200. When the second last image frame corresponding to the second time-point is missing, the client may calculate the user movement information using one or more sensors (e.g., gyro sensor, acceleration sensor, geomagnetic sensor, etc.), and then may generate the second alternative image frame based on the depth information of each object in the first last image frame. That is, as shown in FIG. 13, the client may correct pixels corresponding to each of the multiple objects in the first last image frame based on the difference between client positions (positions of the user wearing the client) at the first time-point and the second time-point, thereby to generate the second alternative image frame. Further, additionally, after the client 200 corrects pixels corresponding to each of the multiple objects based on the difference between the displacement amounts of the objects based on the spacings between the objects and the user, the client 200 may compensate for an area in which an object is previously disposed in the first last image frame. The client may fill the previous object placement area with a specific color combination based on a surrounding color.

Further, in another embodiment, when the displacement amounts of the objects are different from each other, the client 200 may displace the image frame to be adapted to a placement position of an object having the largest size (the largest displacement amount) and then may adjust pixels corresponding to each of the remaining objects. Thus, pixels corresponding to the object having the largest displacement amount may not be adjusted, such that an empty space generated in the second alternative image frame due to the pixel adjustment may be minimized. Further, in another embodiment, when the user wearing the client moves only in a front or rear direction, the client may enlarge or shrink the first last image frame to generate the second alternative image frame that replaces the missing second last image frame.

Further, when the last image frame corresponding to an n-th time-point (n is a natural number greater than 1) is not received, the client 200 may calculate a difference between the image direction data corresponding to an (n−1)-th time-point and the reproduction direction data corresponding to the n-th time-point. Then, the client 200 may correct the (n−1)-th alternative image frame based on the calculated difference to generate an n-th alternative image frame. That is, when the second last image frame is not received at the second time-point and thus the second alternative image frame is provided, and, then, the third last image frame is received at the third time-point, the user may perceive that the object in the image moves smoothly. However, when the image frame is not continuously received even after the second time-point, the client 200 should generate a next alternative image frame (e.g., a third alternative image frame or the n-th alternative image frame) based on the previously generated alternative image frame (e.g., the second alternative image frame or the (n−1) th alternative image frame). The client 200 may calculate a difference between the image direction data in the (n−1)-th alternative image frame corresponding to the (n−1)-th time-point (or the reproduction direction data measured at the (n−1)-th time-point) and the reproduction direction data measured at the n-th time-point. Then, the client 200 may correct (e.g., displace or convert) the (n−1)-th alternative image frame by the calculated difference to generate the n-th alternative image frame. Thus, the client 200 may provide the user with a natural virtual reality image even when the last image frame is not continuously received from the server 100 due to a communication condition failure.

The method for providing the virtual reality image according to an embodiment as described above may compensate for the omission of the image frame at the specific time-point due to wireless transmission failure of the virtual reality image frame. Thus, the client may naturally reproduce the image while an entire view of the virtual reality space is not shaken even when a specific image frame is not received.

Further, according to one embodiment, extracting and transmitting only one frame from an entire image or generating and transmitting only a frame corresponding to the reproduction direction data may allow presenting a high-resolution image or reducing a communication traffic amount even when transmitting the virtual reality image content in a wireless manner.

Further, according to an embodiment, it is possible to present a real-time image that is immediately responsive to the user movement and is optimized for an object surface of the virtual reality image. Therefore, reality of the virtual reality image and the user immersion thereto may be enhanced.

Further, according to an embodiment, it is possible to compensate for the omission of the image frame even when the frame omission occurs due to a network delay or when performing the virtual reality image correction, thereby to prevent an image such as a crosshair from being displayed on a point other than a point actually indicated by the user.

The above description of the inventive concept is exemplary. Those of ordinary skill in the technical field to which the inventive concept belongs will be able to understand that the above description may be easily transformed into other specific forms without changing the technical concept or essential characteristics of the inventive concept. Therefore, the embodiments described above are exemplary in all respects and should be understood as non-limiting. For example, each component embodied in a single manner may be implemented in a distributed manner. Similarly, components embodied in a distributed manner may be implemented in a combined manner.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for providing a virtual reality image, the method comprising:
    receiving virtual reality image data from a server and allocating the virtual reality image data to a first layer;
    generating a second layer displaying control information of at least one controller;
    receiving movement information of the at least one controller, and determining a collision point between a predetermined object in the virtual reality image data and the control information based on the movement information;
    modifying a shape of the control information based on a normal vector at the collision point, and allocating combination data including the modified control information to the second layer; and
    synthesizing the first layer and the second layer with each other to generate a last image frame.

2. The method of claim 1, wherein the second layer contains at least one graphic user interface,
    wherein the movement information of the at least one controller includes position information about a position of the at least one controller and a direction indicated by the at least one controller.

3. The method of claim 1, wherein the receiving of the virtual reality image data and the allocating of the virtual reality image data to the first layer further includes:
    dividing the virtual reality image data into a plurality of overlay elements and receiving the plurality of overlay elements via separate channels, respectively; and combining the plurality of overlay elements received via the separate channels, and allocating the combination of the plurality of overlay elements to each of a plurality of first layers.

4. The method of claim 3, wherein the determining of the collision point includes:
receiving an overlay element containing a particular object for determining the collision point via a first channel;
determining, by a client, the collision point based on the received overlay element; and
determining the normal vector at the collision point.

5. The method of claim 3, wherein each overlay element of the plurality of overlay elements has (x, y) coordinates,
wherein the server transmits a corresponding overlay element to a client whenever the corresponding overlay element needs to be updated.

6. The method of claim 1, wherein the determining of the collision point includes:
transmitting the movement information of the at least one controller to the server, and requesting the collision point and the normal vector; and
receiving, from the server, the collision point between the control information and the predetermined object in the virtual reality image data, and the normal vector at the collision point, wherein the collision point and the normal vector are determined by the server.

7. The method of claim 1, wherein the control information includes an image representing at least one of a line-of-sight of a user and a central pointer of the at least one controller.

8. The method of claim 1, wherein the receiving of the virtual reality image data includes receiving a first image frame corresponding to a first time-point from the server,
wherein the method further comprises obtaining reproduction direction data and image direction data corresponding to the first time-point,
wherein the reproduction direction data indicates a direction of a particular image frame to be reproduced on a screen of a client at a specific time-point,
wherein the image direction data indicates another direction of another image frame generated by the server in a three-dimensional space.

9. The method of claim 8, wherein the obtaining of the reproduction direction data includes measuring a head movement of a user, and calculating the reproduction direction data based on the measured head movement.

10. A non-transitory computer readable recording medium storing a virtual reality image reproduction program that, when executed by a hardware processor of a computer device, causes the hardware processor to execute the method of claim 1.

* * * * *